Dec. 7, 1954    J. A. CONNOR    2,696,576
COAXIAL CAPACITOR
Filed July 17, 1951
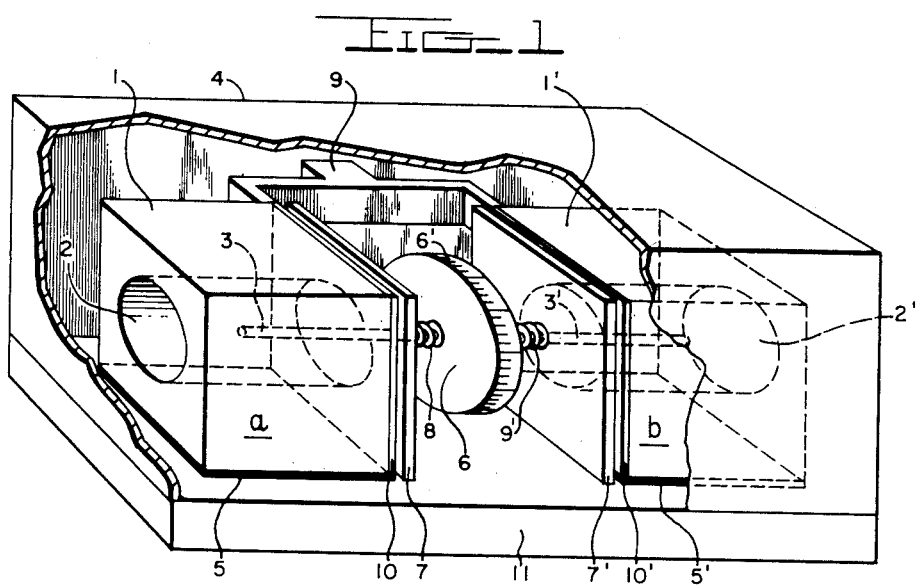
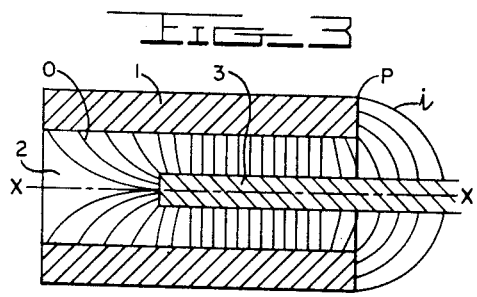
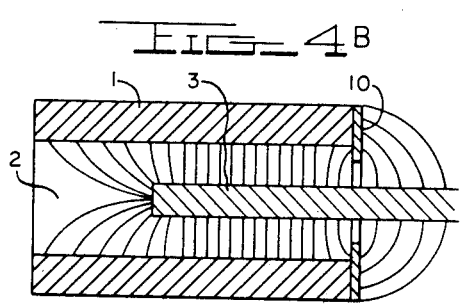
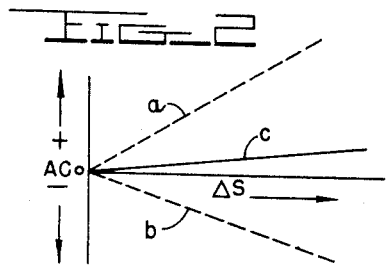
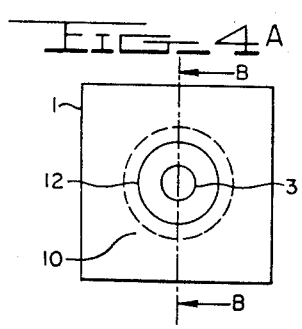
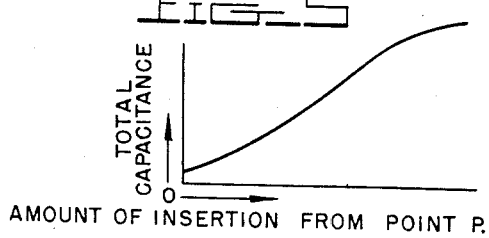
AMOUNT OF INSERTION FROM POINT P.
INVENTOR
JOHN A. CONNOR
BY
ATTORNEYS

United States Patent Office 2,696,576
Patented Dec. 7, 1954

2,696,576

COAXIAL CAPACITOR

John A. Connor, Cheltenham Township, Pa.

Application July 17, 1951, Serial No. 237,274

1 Claim. (Cl. 317—249)

(Granted under Title 35, U. S. Code (1952), sec. 266)

The present invention relates to variable condensers and the like.

More specifically the present invention relates to a variable standard capacitor capable of being accurately varied over minute capacitance increments.

Current research and developmental efforts in the field of radio engineering emphasize the application of high-frequency phenomena. This trend is reasonable in the light of the rapid rate of scientific advancement along these lines and the desirability of applying newly acquired knowledge to the solution of practical problems. It is known, however, that work in advanced electrical engineering and physics is depending, to a great extent, upon supporting activities in the field of basic electrical components. This dependence requires that the art of electrical components be constantly reviewed and improved as a guarantee of an efficient and consistent scientific program. Probably one of the most remote basis for laboratory research, and yet an essential prerequisite for such activities, is to be found in the establishment of laboratory standards. Standards for use in the radio engineering laboratory must often be based upon measuring techniques which are not adequately precise. In other instances radio-frequency measurement techniques provide an extremely high degree of sensitivity and accuracy, for example the measurement of frequency to within several parts in a billion. Laboratory standards should be designed to utilize these precise measurement techiques to the fullest advantage. The desirability of exploiting these standards to the maximum extent is unquestionable.

At the present time there is a growing interest in the measurement of minute magnitudes of capacitance at radio frequencies. These measurements assume a great importance in such activities as the study of the inter-electrode capacitances of vacuum tubes and the study of oscillator stability. Capacitance values as small as 0.01 micromicrofarad are being measured regularly in the radio laboratory, utilizing techniques which are well established. Some specialized radio engineering activities have undertaken the problem of measuring capacitance magnitudes in the order of 0.001 micromicrofarad and even smaller. The importance of measuring minute values of capacitance is necessarily magnified as higher-frequency phenomena are encountered and where increased circuit stability is demanded.

The design of a laboratory-standard capacitor of extremely small capacitance poses many difficult problems depending upon the intended circuit application. When a definite magnitude of fixed capacitance is required and the stray capacitance from the terminals to ground becomes appreciable, the total capacitance is uncertain in magnitude because the magnitude of the stray capacitance has no definite value if its environment is changed.

The design of a capacitor standard to provide precise capacitance increments can avoid the necessity of knowing the absolute magnitude of capacitance between two terminals by inserting for example, the standard capacitance in a given tuned circuit and noting its effect, on the resonant frequency of the circuit. Then by placing an unknown capacitance to be measured parallel with the standard, and measuring the amount by which the standard capacitance must be decreased to produce the same effect on the circuit before the unknown capacitance was inserted therein, the value of the unknown capacitance may be accurately determined.

Accordingly, one object of the instant invention is to provide a variable capacitor capable of producing small, precise incremental variations.

Another object of the instant invention is to provide a variable capacitor capable of producing small, precise, linear incremental variations.

Still another object of the instant invention is to provide a variable capacitor capable of producing small, precise, incremental variations and which occupies a minimum of space.

Another object of the instant invention is to utilize a pair of capacitor elements having a given linear incremental variation in a manner which will provide a smaller linear incremental capacitance variation than either of the capacitor elements.

One feature of the present invention is in providing a variable capacitor including two capacitor elements additively connected together which are simultaneously variable in opposite directions in different incremental amounts.

Another feature of the instant invention comprises a variable condenser including two cylindrical additively connected capacitor elements, the cylindrical capacitor elements each comprising an outer cylindrical electrode with a movable inner cylindrical electrode coaxially protruding into the outer electrode, and means for simultaneously increasing the amount of surface of the inner electrode of one capacitor element protruding into the associated outer electrode and decreasing the amount of surface of the other inner electrode protruding into the associated outer electrode to vary the respective capacitances in opposite directions in different incremental amounts.

Still another feature of the instant invention is in improving the linearity of the incremental variation of the cylindrical differential capacitor by using an aperture plate to cover one end of the cylindrical capacitor, the aperture being circular and having a diameter substantially less than the inner diameter of the outer electrode element of the associated capacitor.

Other features, and objects will become apparent upon making reference to the exemplary embodiments disclosed in the specification and drawings wherein:

Figure 1 is a cut-out view of the preferred embodiment of the instant invention;

Figure 2 is a diagram showing the incremental capacitance variation of the apparatus shown in Figure 1 over the linear region thereof;

Figure 3 is a cross-sectional view of a prior art cylindrical capacitor element;

Figure 4A is an end view of capacitor element $a$ of the apparatus of Figure 1;

Figure 4B is a cross-sectional view of the capacitor element $a$ shown in Figure 4A taken along section line b—b, and Figure 5 shows the capacitance variation of the prior art capacitor element of Figure 3.

The most practical standard of capacitance increments should provide capacitance variations directly proportional to some simple dimensional variations, thus permitting linear interpolation. Adhering to the prerequisite of employing a simple electrode geometry to obtain a linear incremental capacitance variation, the coaxial-cylinder electrode configuration is preferred. The coaxial-cylinder electrodes being restricted in extent due to the symmetrical circular enclosures has a more restricted fringing flux so that any non-linearity of variation due to the fringe capacitance is less than with other capacitance configurations such as the parallel plate condenser. Another important advantage of a coaxial cylinder capacitor is that its capacitance is not affected by temperature variations as much as the parallel plate condenser.

The preferred embodiment of the instant invention is shown in Figure 1 and broadly includes a pair of cylindrical condensers $a$, $b$ comprising respectively outer metallic electrodes 1—1′ and inner metallic electrodes 3—3′. Outer electrodes 1—1′ have cylindrical bores 2—2′ formed therein. The surface of the electrodes 1—1′ bounding the cylindrical bores 2—2′ are of course cylindrical in shape so that electrodes 1—1′ may properly be called cylindrical electrodes. The outer electrodes are bulky in form to reduce the equivalent series inductance of the condenser. The particular shape, however, of the outer portions of electrodes 1—1' is not important.

The inner electrodes 3—3' are extensions of the same shaft 9' and are supported by suitable bearing surfaces bounding the internally threaded openings in respective support blocks 7—7'. Thread portions are provided on shaft 9' to engage the threads in support blocks 7—7' so that rotation of shaft 9' in one direction will move the electrodes 3—3' simultaneously in one direction along the axis of cylindrical electrodes 1—1', and rotation in the opposite direction will move electrodes 3—3' in the opposite direction along the said axis. The axis of cylindrical openings 2—2', of course, falls along the same line (i. e., they are coaxial). Consequently movement of shaft 9' will cause the capacitance of capacitor elements $a$ and $b$ to vary in opposite directions. Capacitor elements $a$ and $b$ are connected in parallel circuit relation by means of a conductive yoke member 9 extending between outer electrodes 1—1', and the mid portion of shaft 9', which is made of a conductive material (as are the electrodes of capacitor elements $a$ and $b$) which electrically connects inner electrodes 3—3'.

As is well known in the art, the net capacity of two capacitor elements connected in parallel is equal to the sum of the capacities of the individual capacitor elements. Thus if the linear incremental capacitance variation of capacitor elements $a$ and $b$ is slightly different, the net incremental variation of capacitance of the parallel combination of capacitor elements $a$ and $b$ will be a small linear variation. This result is shown in the curve of Figure 2 where the ordinate of the curve there shown represents incremental capacitance variation and the abscissa represents the change in position of the inner electrodes from a given position. Dotted curves $a$ and $b$ represent respectively the incremental capacitance variation of capacitor elements $a$ and $b$ as shaft 9' is rotated in a direction such that inner electrode 3 is inserted further into cylindrical passageway 2 of capacitor element $a$ (thus increasing the capacitance thereof) and inner electrode 3' is simultaneously moving out of cylindrical passageway 2' of capacitor element $b$ (thus decreasing the capacitance thereof). Curve $c$ shows the net incremental variation of capacitance of capacitor elements $a$ and $b$ in parallel and is equal to the sum of curves $a$ and $b$.

One of the factors which affect the incremental variation of a cylindrical capacitor is the ratio of diameters of the outer and inner cylindrical electrodes. Thus, for example, if the diameter of inner electrodes 3 and 3' are equal, and the diameter of cylindrical passageway 2 is less than the diameter of cylindrical passageway 2', then the capacitance variation of capacitor element $a$ per inch of movement of inner electrode 3 will be greater than the capacitance variation of capacitor element $b$ per inch of movement of inner electrode 3'.

To prevent stray fields from affecting the capacitance variation an electrostatic shield 4 made of a conductive material completely encloses capacitor elements $a$ and $b$ and suitable end plates (not shown) are fixed to the opposite ends of the stator blocks 1 and 1'.

A drum 6 is fixed to shaft 9' and carries an index 6' on the periphery thereof to indicate the amount of capacitance variation. Shaft 9' may be rotated in any suitable manner. For example, drum 6 may protrude through an opening (not shown) in shielding enclosure 4 and thus be moved directly by hand. If desired a finer control over the movement of shaft 9' may be effected by a gearing system (not shown) utilizing a vernier scale arrangement in a manner well known in the art.

To eliminate hand capacitance effects, the moveable electrodes 3—3' are grounded through blocks 7 and 7' electrically attached to base plate 11.

Accordingly suitable insulation between outer electrodes 1—1' and shielding inclosure 4, which would be grounded, should be provided. In the embodiment of Figure 1, blocks 5 and 5' made of a suitable insulation material are placed under respective outer electrodes 1—1'.

The terminals for the capacitor have been omitted for purposes of clarifying the drawings. It will be understood however, that in practice one terminal would be taken from yoke 9 and the other from shield 4.

It should be noted that where extremely small incremental capacity variations are required, small variations from the linear incremental capacitance condition will cause serious errors. It is important therefore to consider the factors affecting a linear incremental capacitance variation. Reference should now be made to Figure 3 showing a cross sectional view of a conventional type cylindrical capacitor with electric field lines diagrammatically indicated thereon.

First of all, the walls of outer electrodes bounding the passageway 2 and the outer surface of inner electrode 3 must be cylindrical (the cross-section in such case being circular). Any deviation from this cylindrical shape will cause non-linearity in the incremental capacitance variation.

The electrodes of the capacitor elements $a$ and $b$ must therefore be carefully machined. In addition the axis of inner cylindrical electrode 3 must be kept coaxial with the axis of cylindrical passageway 2 of outer electrode 1.

The fringe flux also causes non-linearity in capacitance variation. As shown in Figure 3, there are two types of fringe flux to consider. The insertion end fringe flux $i$ occurs between the outer electrode 1 and the inner electrode 3 at the point where the inner electrode is inserted into the cylindrical passageway 2. The flux lines in this area are not uniform in density and this causes non-linear effects as the tip of the inner electrode is inserted into the cylindrical passageway 2.

The other fringe flux $o$ is called the "open end" fringe flux and is due to the flux existing between the tip end of the inner electrode and the portion of the outer electrode in the vicinity of the end of the outer electrode remote from the insertion end.

The diagram of Figure 5 shows the effect of the insertion and open end fringe flux on the total capacitance of a single-cylindrical capacitor element shown in Figure 3. The ordinate of Figure 5 represents the capacitance of the capacitor element and the abscissa represents the amount inner electrode 3 is inserted into cylindrical passageway 2 measured from the insertion end $p$ of outer electrode 1. The effect of the respective insertion end and open end flux is non-linearity in the capacitance variation when the inner electrode is in the vicinity of the insertion and open ends respectively of outer electrode 1.

The non-linearity due to the insertion end fringe flux can be overcome to a significant degree by means of a metal diaphragm or plate member 10 placed over the insertion end of the outer electrode 1 as shown most clearly in Figures 4A and 4B. Diaphragm member 10 has a circular aperture 12 shown more clearly in Figure 4A through which the inner electrode protrudes. The diameter of aperture 12 is made substantially smaller than the diameter of the cylindrical passageway 2. The electric field or flux lines are effected in a manner which appreciably improves the linearity of the capacitance variation at the insertion end of the outer electrode.

The percentage by which the capacitor electrodes deviate from the cylindrical condition is a measure of the deviation of the capacitor element from the condition of linear incremental capacitance variation. Consequently, since, in general, the absolute errors in machining materials do not vary in proportion to the size of the material being machined, there is a practical limit to the smallest diameter of inner electrode which can be used for a given error tolerance. It can be shown that the smaller the capacitance increment per inch of movement of inner electrode 3 desired for a single cylindrical capacitor element, the larger must be the ratio between the outer cylindrical electrode 1 and the inner electrode 3.

The instant invention however makes the size of the capacitance increments per inch of movement of the inner electrode independent of the absolute ratio between the size of the outer and inner electrode of a single capacitor. Because of the differential character of the embodiment of Figure 1, the incremental capacitance variation is dependent only on the relative incremental capacitance variation of condensers $a$ and $b$ as previously described in connection with the explanation of the showing in Figure 2.

The reduction in size of a standard capacitor utilizing the teachings of the instant invention can be appreciated from the fact that a differential capacitor of the type shown in Figure 1 having respective cylindrical passageways 2—2' with diameters of 1.25 and 2.508 inches, and inner electrodes 3—3' having a diameter of .1875 inch will produce the same incremental capacitance variations (.200 μμf. per inch of inner electrode insertion) with an error tolerance of less than 1 percent as a single-unit cylindrical capacitor having an inner electrode diameter of .1875 inch and an outer electrode diameter (i. e., diameter of the cylindrical passageway 2) of 18.75 feet.

It should be noted that the broader aspects of the instant invention includes embodiments where the incremental variations are other than linear.

For purposes of defining the terms used in the claim, the expression "impedance elements of the same class" refers to such impedance classifications as capacitance, inductance, etc.

The term "additively" used in the expression "means additively coupling said impedance elements" refers to the fact, for example, that the capacity elements $a$ and $b$ are connected so that the net capacity of the capacitor forming the preferred embodiment of the instant invention equals the sum of the effects of the individual capacity elements $a$ and $b$.

Many modifications may be made of the exemplary embodiments above disclosed without deviating from the broader aspects of the instant invention.

The invention described herein may be manufactured and used by or for the Government of the United States of America for governmental purposes without the payment of any royalties thereon or therefor.

What is claimed is:

A variable capacitor comprising the combination of a first and second outer electrode displaced from each other each having a cylindrical surface forming the confines of an opening therein, a plate member enclosing one end of the opening formed in each of said electrodes and having a circular opening coaxially of said cylindrical surface with a diameter substantially less than the diameter of the opening formed by the cylindrical surface of said first and second electrodes, an inner cylindrical electrode protruding coaxially through the opening in the plate member associated with said first and second electrodes to provide first and second capacitor elements, means for simultaneously moving the inner electrode associated with said first and second electrodes to linearly decrease the amount of surface of said inner electrode protruding into one of said outer electrodes and to linearly increase the amount of surface of said inner electrode protruding into the other one of said outer electrodes, the diameter of at least one of the electrodes forming said first capacitor element being different than the diameter of the corresponding electrode of said second capacitor element, means connecting said first and second capacitor elements in parallel circuit relation.

References Cited in the file of this patent

UNITED STATES PATENTS

| Number | Name | Date |
|---|---|---|
| 1,480,227 | Stevenson | Jan. 8, 1924 |
| 1,587,389 | Lissen | June 1, 1926 |
| 1,641,438 | Jones | Sept. 6, 1927 |
| 1,681,517 | Clough | Aug. 21, 1928 |
| 2,045,910 | Harnett | June 30, 1936 |
| 2,155,050 | Johnson | Apr. 18, 1939 |
| 2,361,657 | Schock | Oct. 31, 1944 |
| 2,386,651 | Bisson | Oct. 9, 1945 |
| 2,510,822 | Jacot | June 6, 1950 |

FOREIGN PATENTS

| Number | Country | Date |
|---|---|---|
| 595,042 | Great Britain | Nov. 25, 1947 |
| 628,499 | Germany | Apr. 6, 1936 |